July 13, 1948.  M. J. MINTER  2,444,944
TOWING APPARATUS

Filed Nov. 9, 1945  2 Sheets-Sheet 1

INVENTOR.
MARVIN J. MINTER
BY
J. H. Church & W. E. Thibodeau
ATTORNEYS

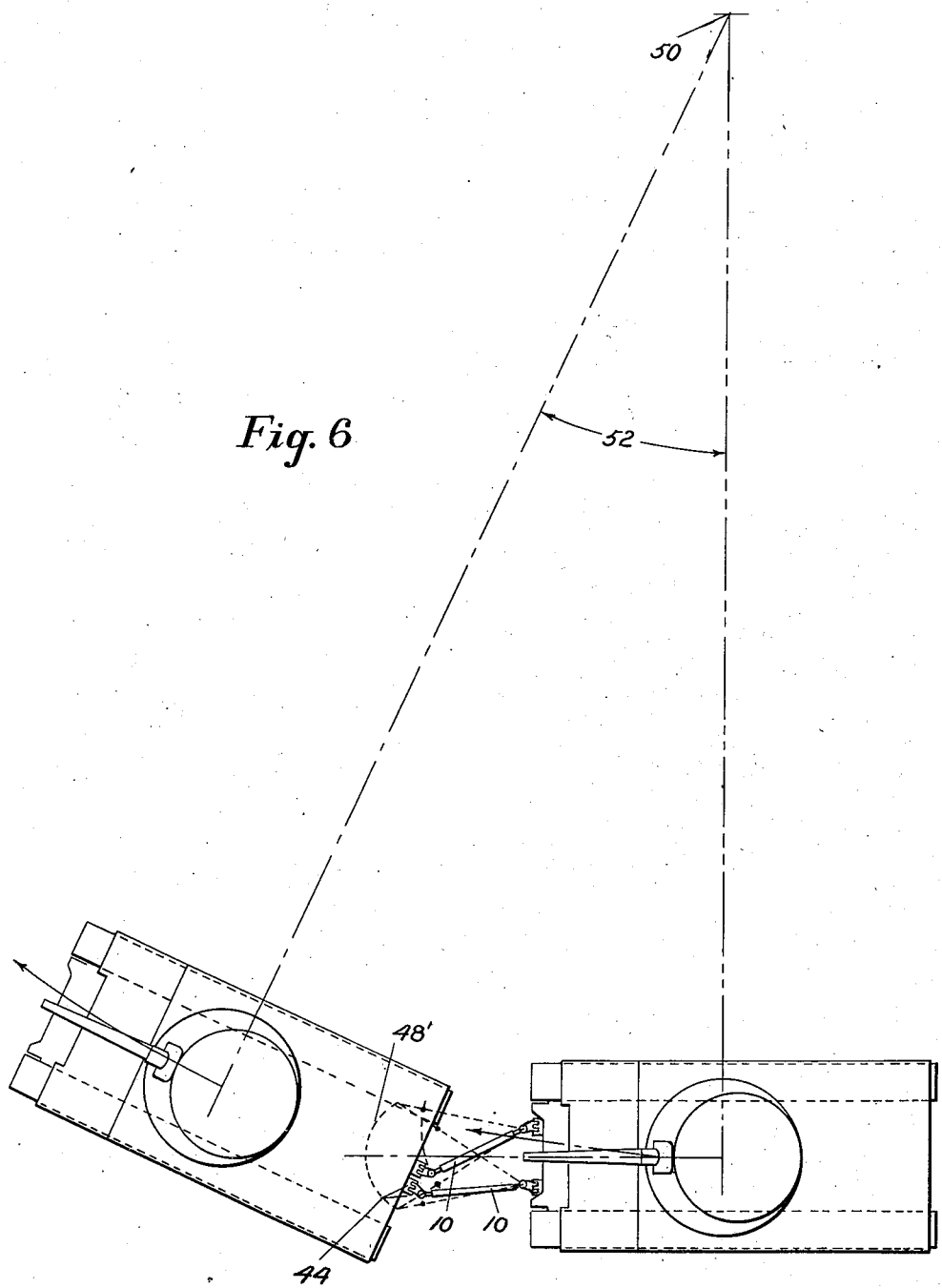

Patented July 13, 1948

2,444,944

UNITED STATES PATENT OFFICE 2,444,944

TOWING APPARATUS

Marvin J. Minter, Detroit, Mich.

Application November 9, 1945, Serial No. 627,769

3 Claims. (Cl. 280—33.44)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to a novel and improved towing device for vehicles and particularly for vehicles of the track-laying type, which may be required to execute intricate maneuvers over difficult terrain under adverse conditions.

One of the objects of this invention is to devise a superior towing apparatus for use on track-laying vehicles and especially for use in connection with the recovery of disabled tanks on the battlefield.

Another object of this invention is to devise a towing apparatus which uses two comparatively light tow bars, instead of one comparatively heavy tow bar. This feature is considered especially important in the case of extremely heavy vehicles where the weight of a single tow bar of adequate capacity would otherwise exceed the strength of one man to handle easily.

Another object of this invention is to devise a towing apparatus for track-laying vehicles whereby the towed track-laying vehicle better tracks the towing track-laying vehicle without setting up excessive stresses such as are frequently encountered with conventional A-frame tow bars when operating over difficult terrain.

An additional object of this invention is to devise a towing apparatus which will be quite stable in operation. Stability in operation is important in order that the vehicle will not "jack-knife" in either forward or reverse operation or in maneuvering a round turn in either direction. Stability in operation is also necessary in order that no undue stresses may be set up in any part of the towing device caused by jack-knifing, surging or other forms of uncontrollable movement.

A still further object of this invention is to devise a towing apparatus which will give maximum maneuverability to both the towing and the towed vehicle with a minimum of effort and skill required of the operators of the vehicle.

Another object of this invention is to devise a tow bar which is light, simple, interchangeable and especially suitable for use with my towing arrangement. The invention consists generally of certain novel features of structure and of arrangement which will be set forth in detail as the description proceeds. A preferred embodiment of the invention is illustrated in the accompanying drawings, wherein:

Figure 1 is a schematic elevational view showing one tank towing another tank by means of my novel towing arrangement.

Figure 2 is a schematic plan view of the vehicles illustrated in Figure 1. The towing apparatus shown utilizes two equal length tow bars. With this apparatus, the tracks of the towed vehicle will tend to follow substantially the path of the tracks of the towing vehicle through practically all maneuvers.

Figure 3 is a schematic elevational view similar to Figure 2 except that the tow bars are of unequal length, so that tracks of the towed vehicle will tend to follow a path somewhat to one side of the path of the tracks of the towing vehicle. This apparatus is used particularly when the terrain being traversed is of such character that it may be desirable for the tracks of the two vehicles to follow entirely different paths, such as in traversing extremely soft or marshy ground.

Figure 6 is a schematic plan view similar to Figure 2, except that the vehicles are shown making a turn. This view illustrates how my towing apparatus operates in making a turn, and also illustrates the practical limit of movement of each of the tow bars.

Similar characters of reference designate corresponding parts throughout the several views.

The character and operation of my novel towing apparatus can best be understood by first comprehending the type of tow bar which I conceived to be most suitable for use with my towing apparatus. The type of towing bar which I prefer to use, I have illustrated in Figures 4 and 5. It will be appreciated, however, that substantial variations in the design of this tow bar can be made without departing from the spirit of my invention.

Figure 4:
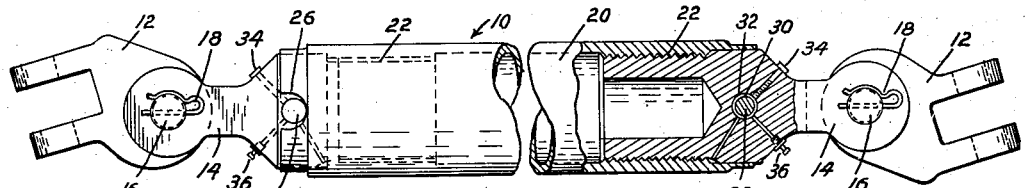
Figure 4 is a plan view of a towing bar, suitable for use with my towing arrangement, showing the details of construction.
Figure 5:
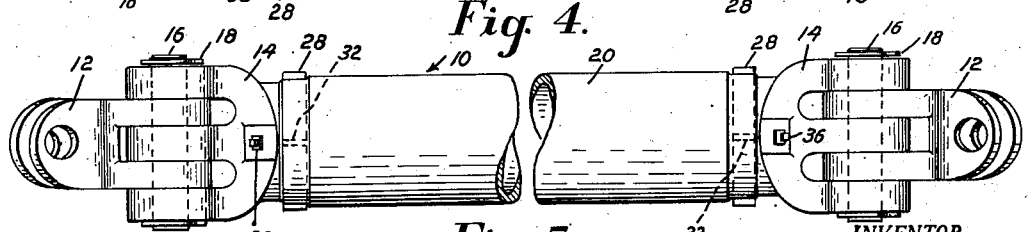
Figure 5 is an elevation view of the tow bar shown in Figure 4.

With reference to Figures 4 and 5, it can be seen that tow bar assembly 10 is fitted at each end with a double ended clevis type of member 12. The particular geometry of clevis member 12 will depend on the geometry of the vehicle attaching points. However, I prefer to design this member so that the same part can be used on both ends of tow bar assembly 10 so as to reduce the number and variety of parts required and to promote standardization generally. Clevis members 12 are fastened to the clevis end of the tow bar assembly 10 by means of pin 16 which is held in place by fasteners 18.

Tow bar assembly 10 consists essentially of a tubular member 20, and two similar clevis end members 14. Tubular member 20 is threaded at each end as indicated generally by reference character 22 to receive a corresponding threaded portion of clevis end member 14. A smooth recess at each end of the tubular member 20 serves as a guide for the clevis member 14 and also provides a seal surface for this same member. Each end of the tubular member 20 is also equipped with a cut-out portion 26 which serves as a stop for the rotary movement of the tubular member 20 with respect to the clevis end members 14. This limiting of movement is accomplished by stop pin 28. Stop pin 28 fits into hole 30 of clevis end member 14. A circumferential groove 32 cut midway of the end of stop pin 28 serves a dual purpose as will be presently described. Grooves 32 provide both a means of readily locking pin 28 into clevis end member 14 and as a lubrication channel. This is most clearly shown in the right hand end of Figure 4 which is a partial section through the center of the tow bar assembly. This view shows that clevis end member 14 is drilled and threaded to receive a small locking cap screw 34. The end of cap screw 34 is suitably shaped to mate with groove 32, thus effectively locking pin 28 in place.

Clevis end member 14 is also drilled and tapped to receive a suitable lubrication fitting 36 so that lubrication can be conducted directly to groove 32. Another hole 38 is also drilled in clevis end member 14 to connect the middle of hole 30 in the neighborhood where groove 32 is designed to normally be located with the threaded portion of the clevis end member 14. This hole thus serves as a channel for lubricant for the thread and also for the other friction surfaces. It can thus be readily seen that the lubricated threads of the tubular member 20 and the clevis end member 14 serve to provide a limited amount of motion, as determined by size and shape of aperture 26 and stop pin 28. The freedom of movement provided by the clevis member 12 and the threaded portions of tube assembly 10 cooperate to provide a limited amount of universal action.

Figure 1:
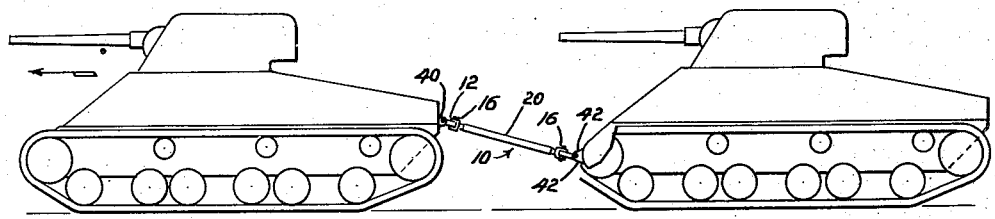
Figure 2:
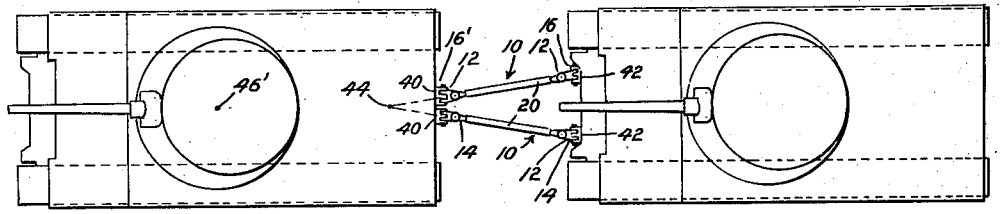

Installation of my tow bar, composed of tow bar assembly 10 and clevis members 12, is shown in Figures 1 and 2. Two towing lugs 40, suitable for engagement with clevis members 12, and which are conveniently installed permanently on the rear of the towing vehicle by welding or other convenient or suitable means serve as the front points of attachment for the tow bars. Attachment is made by means of pins and fasteners similar to pins 16 and snap fasteners 18 shown in Figures 4 and 5 in larger detail. Towing lugs 42 at the front of the towed vehicle are preferably similar to the towing lugs 40 on the towing vehicle except for the exact details of contour at the attachment point. This contour is of course a design detail which will be determined by the exact character of the regions of attachment of the vehicle, and such design will be readily apparent to a designer skilled in the art. The attaching pins shown generally at 16 in Figure 2 are exactly similar to pin 16 in Figures 4 and 5, which show also in detail snap fasteners 18 which are used to hold them in place.

Referring to Figure 1, it can be seen that I have preferred to locate towing lugs 40 on the towing vehicle at a greater height from the ground than lugs 42 on the towed vehicle. I prefer this design because the upward pull which the towing tank may then exert on the towed tank is of material assistance in towing operations over rough ground, also the pull of the towed tank then tends to pull downward on the towing tank and aid in giving better traction to the towing vehicle, particularly over terrain where the tracks might otherwise tend to slip or skid.

Referring now to Figure 2, which is a schematic plan view of the two tanks showing my towing apparatus, it can be seen that I have arranged the two towing lugs 40 symmetrically about a longitudinal centerline through the towing vehicle and that likewise I have located the two towing lugs 42 symmetrically about the longitudinal centerline of the towed vehicle, but at a somewhat greater distance apart than lugs 40. It can thus be seen that the two tow bars are at a slight angle to one another and that the projection of the centerline through the tow bars intersect one another considerably ahead of the towing lugs 40. The geometry thus established is of considerable importance in securing maneuverability of both vehicles and stability in operation, particularly in executing turns and other maneuvers as will be brought out later. Experience with the spacing and angularity of the tow bars has shown that the exact location of point 44 is not extremely critical. When point 44 is located at the center of turning of the towing vehicle, which in the example shown is approximately at point 46', steering of the towing vehicle is most easily accomplished, however, the effective turning radius is materially lengthened. Consequently in order to achieve a maximum of mobility for the combination of the two vehicles I have found it desirable, in the case of the illustration shown, to move point 44 back to the approximate position I have illustrated. This position has seemed to be about the best compromise between ease of steering and range of mobility and maneuverability.

Figure 3:
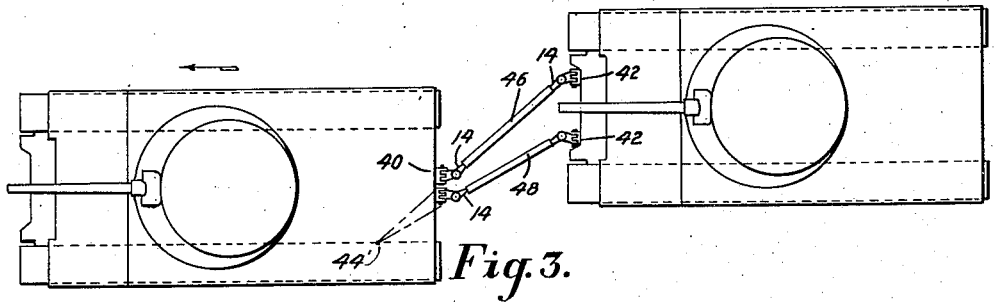

Referring now to Figure 3, for cases where it is desired to have the towed vehicle follow a different path from that of the towing vehicle, I substitute for the two tow bars 10 of Figure 2, two bars 46 and 48, similar to tow bars 10 but of unequal length. When the towed and towing vehicles are headed in the same direction as shown in Figure 2, the tow bars 46 and 48 are at a slight angle to one another. The projections of the centerlines of tow bars 46 and 48 then intersect at a point 44'. Point 44' is thus similar to point 44 of Figure 2, except that it is located off the centerline of the towing vehicle. This apparatus makes the towing slightly more difficult than the apparatus of Figure 2, but it has been found to be advantageous in operations on marshy ground, where it is desired to have the tracks of the towed and towing vehicles follow different paths.

To best understand how my towing apparatus operates reference is made to Figure 6, wherein is shown two vehicles equipped with tow bars, similar to Figure 2 except that the vehicles are shown in a turning position. In this position, it can be seen that the intersection of the centerlines of the tow bars, as shown at point 44, lies off-center of the longitudinal centerline of the turning vehicles; and it can also be seen that for every position of turning, there will be a very definite position for the tow bar. The point 44 will, for various degrees of turning, follow a definite path such as I have indicated at 48'. This path 48' will vary with the length of the tow bars with the exact spacing arrangement used for any given design and with the contour of the terrain being traversed by the vehicles. In general, however, the limits of the path 48' is determined by the limits of the lateral movement of each of the tow bars 10. The limits of the lateral movement of the tow bars 10 may be determined by the interference of the tow bars themselves, by the interference of one of the vehicles with one of the tow bars or by the interference of the vehicles themselves, as determined by any particular sesign for any given terrain.

The effective center of turning, 50, of the two vehicles is determined by projecting, thru the center of turning of each vehicle, the normal to the longitudinal centerline of each vehicle. The intersection of these normals at point 50 determines the effective center of turning of the two vehicles. The angle of turn, 52, is the angle between the normals. The angle of turn, 62, is identical with the angle between the longitudinal centerlines of the two vehicles.

The above described towing apparatus has been found to be very effective under a very wide range of conditions. It has been found to be effective in both forward and reverse directions, and to work very well over rough terrain and on the side slopes of various varieties. I believe that this effectiveness is due both to the geometry of my towing apparatus and to the universal action which is present in the type of tow bars which I have shown in detail in Figures 4 and 5. I have found that my design has practically eliminated tow bar and towing lug failures due to overstressing, and that my tow bars are much lighter and easier to handle than tow bars of either the A-frame and pintle design type previously used.

Although I have shown and described my towing apparatus as applied to two tanks, it will be readily apparent to one skilled in the art that my towing apparatus is readily adaptable to other types of vehicles and equipment such as automobiles, trucks, trailers, tractors, conveyors, farm cultivation equipment, snow plow equipment, and other similar devices. Furthermore, inasmuch as my towing arrangement functions very effectively in the reverse direction, it is adaptable to many types of pushing operations, such as bull-dozing. It is also apparent that my towing arrangement can readily be used in trains of various vehicles.

Various changes may be made in the specific embodiment of my invention without departing from the spirit thereof, or from the scope of the appended claims.

What I claim is:

1. A tow bar composed of a tubular member threaded at each end, two clevis-end members threaded to mate with the threads of said tubular member, means associated with said tubular member and said clevis-end members to permit their limited relative movement and means to lubricate said members.

2. Towing apparatus comprising two spaced lugs on a towing vehicle, two differently spaced lugs on a towed vehicle, two tow bars having clevis formations at each end, four members having clevis formations at each end, arranged so that each tow bar is laterally spaced from the other throughout its length and is attached to a towing lug of the two vehicles, by means of the one of the members having said clevis formations at each end, in a normally substantially trapezoidal relationship indicated by a line through the horizontal axis of each of said two laterally spaced tow bars, a line connecting said two spaced lugs on said towing vehicle, and a line connecting said two spaced lugs on said towed vehicle.

3. In combination, two laterally spaced connecting means on a first vehicle, two laterally spaced connecting means on a second vehicle, and two similar tow bar assemblies each connecting one of said two laterally spaced connecting means on said first vehicle with a correspondingly laterally spaced one of said two laterally spaced connecting means on said second vehicle, whereby said tow bar assemblies are laterally spaced from each other throughout their length, normally indicating together with a line joining said connecting means on said first vehicle and a line joining said connecting means on said second vehicle a substantially trapezoidal formation.

MARVIN J. MINTER.

REFERENCES CITED

The following references are of record in the file of this patent:

UNITED STATES PATENTS

| Number | Name | Date |
|---|---|---|
| 1,313,381 | Hiller | Aug. 19, 1919 |
| 1,517,547 | Ekberg | Dec. 2, 1924 |
| 2,179,439 | Trow | Nov. 7, 1939 |

FOREIGN PATENTS

| Number | Country | Date |
|---|---|---|
| 173,575 | Great Britain | Dec. 22, 1921 |